United States Patent
Takeuchi (10) Patent No.: US 6,547,318 B2
(45) Date of Patent: Apr. 15, 2003

(54) VEHICLE BODY FRONT STRUCTURE

(75) Inventor: Akihide Takeuchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/989,392

(22) Filed: Nov. 21, 2001

(65) Prior Publication Data

US 2002/0063445 A1 May 30, 2002

(30) Foreign Application Priority Data

Nov. 24, 2000 (JP) .................................. 2000-357222

(51) Int. Cl.[7] .............................................. B60R 27/00
(52) U.S. Cl. .................. 296/204; 296/194; 296/203.01; 296/29
(58) Field of Search ................................ 296/194, 204, 296/203.01, 193, 195, 205, 197, 29, 30

(56) References Cited

U.S. PATENT DOCUMENTS

| | | | | |
|---|---|---|---|---|
| 3,791,472 A | * | 2/1974 | Tatsumi | 296/204 |
| 4,789,199 A | * | 12/1988 | Komatsu | 296/194 |
| 5,560,674 A | * | 10/1996 | Tazaki et al. | 296/193 |
| 5,577,797 A | * | 11/1996 | Takanishi | 296/203.03 |
| 5,861,544 A | * | 1/1999 | Kosaraju et al. | 73/12.04 |
| 5,884,963 A | * | 3/1999 | Esposito et al. | 296/189 |
| 6,273,486 B1 | * | 8/2001 | Ezzat et al. | 296/194 |
| 6,299,240 B1 | * | 10/2001 | Schroeder et al. | 296/194 |

FOREIGN PATENT DOCUMENTS

| | | | |
|---|---|---|---|
| JP | 05270443 A | * | 10/1993 |
| JP | 7-165118 | | 6/1995 |
| JP | 2000-16333 | | 1/2000 |

* cited by examiner

Primary Examiner—D. Glenn Dayoan
Assistant Examiner—Lori L Coletta
(74) Attorney, Agent, or Firm—McGinn & Gibb, PLLC (57) ABSTRACT

A vehicle body front structure includes: a frame having a front frame and a floor frame joined together by a curved portion provided along a toe board, the front frame extending in a forward direction from the curved portion, the floor frame extending in a rearward direction therefrom; a side structure disposed transversely outwardly of the frame, respectively; and a closed-section torque box for joining the frame to the side structure. The frame and the side structure are joined to an upper surface of the torque box to be substantially horizontally relative to each other, and are also joined to a lower surface of the torque box which is formed in such a manner as to be oriented downwardly toward the side structure, to thereby increase the joint area of the torque box on a side thereof where the torque box is joined to the side structure.

26 Claims, 5 Drawing Sheets

VEHICLE BODY FRONT STRUCTURE

BACKGROUND OF THE INVENTION

1. Field of the Invention

The present invention relates to a vehicle body front structure having closed-section torque boxes for joining frames and side structures.

2. Description of the Related Art

In general, in a front structure of a vehicle such as an automobile, front frames extend in a longitudinal direction of a vehicle body along inner sides of wheel aprons constituting side walls of an engine compartment. The front frame inclines downwardly to connect to a floor frame from a toe board, as a boundary, which separates a passenger compartment from the engine compartment. On the other hand, a side structure which defines the vehicle width is disposed outwardly of the frame by the width of a wheel well in which a wheel is accommodated. The side structure is constituted by a front pillar and a side sill which is connected to a lower end portion of the front pillar to form a step portion or the like. A toe board portion constitutes a rear portion of the wheel well and joins the frame and the side structure in a transverse direction.

However, the rigidity of a portion in the vicinity of the rear end portion of the front frame cannot be sufficient with the construction in which the front frame is joined to the side structure only by the toe board. In case an excessive impact load is applied to the front frame from the front, not only the deformation behavior at the rear end portion of the front frame become uncertain but also the dispersion of the impact load to the side structures becomes insufficient, there being caused a risk that the front frame starts to deform too early. To cope with this, a torque box is disposed between the front frame and the side structure in order to assist the toe board in allowing the side structure to effectively bear the load applied to the front frame.

Figure 8:
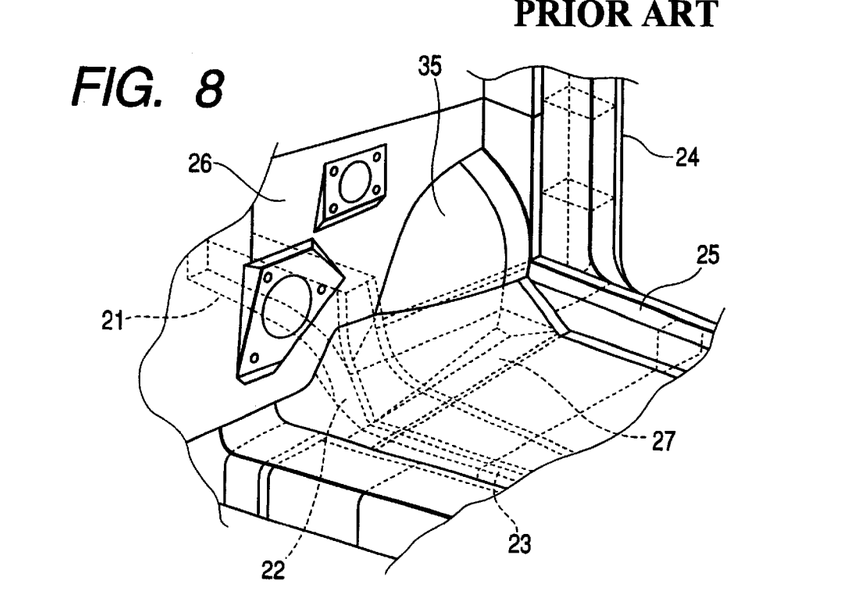
FIG. 8 is a perspective view of a torque box structure according to a first conventional example.
Figure 9:
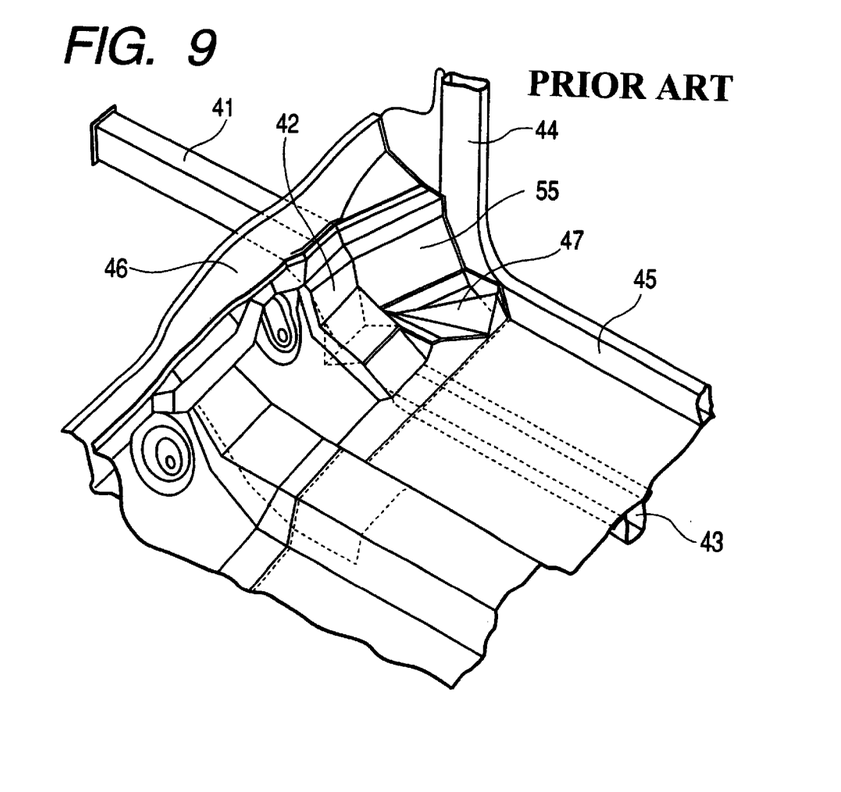
FIG. 9 is a perspective view of a dash panel structure according to a second conventional example.

Conventionally, a torque box structure disclosed in JP-A-7-165118 which is in FIG. 8 as a first conventional example and a dash panel structure disclosed in JP-A-2000-16333 which is shown in FIG. 9 as a second conventional example are taken as a torque box disposed to complement and reinforce the toe board which joins the front frame to the side structures as described above. The first conventional example shown in FIG. 8 is constructed such that a flange for joining a rear portion 22 of a front side member (a front frame) 21 to a dash panel (a toe board) 26 is extended downwardly so as to overlap a floor member of a torque box 27 for joining a side structure including a front pillar 24 and a side sill 25 to the front side member 21, so that the rigidity of the flange is increased, whereby the weight of the dash panel is reduced and the welding performance is also improved. Reference numeral 35 denotes a wheel well.

On the other hand, the second conventional example shown in FIG. 9 is constructed such that a dash panel 46 is divided into half so as to form a closed-sectional structure at the divided portion with upper and lower panels, that a rear end portion 42 of a front side member 41 is connected to the closed-sectional structure, and that the closed-sectional structure is extended as far as a proximal portion of a front pillar 44 to be joined thereto. Then, a torque box 47 for joining a frame to a side structure including the front pillar 44 and a side sill 45 is disposed at a lower portion of the dash panel 46 or a portion of the rear end portion 42 of the front side member 41 which inclines downwardly to connect to a floor frame 43, whereby the impact load from the front is borne by the closed-sectional structure to transmit part of the impact energy to the front pillar 44 or the like without providing any particular cross member but with a light and inexpensive structure. Reference numeral 55 denotes a wheel well.

In the vehicle body front structure incorporating the conventional torque boxes, however, any of the torque boxes for joining the front side member to the side structure is joined to the inclined portion where the rear end portion of the front side member is joined to the floor frame one step down or to a portion of the floor frame rearward of the inclined portion. Then, in case an excessive impact load resulting from a frontal collision is applied to the front side members, there has been caused a risk that the front side members start to deform toward the interior of the passenger compartment before the sufficient transmission or dispersion of the impact load through the torque box is attained. Moreover, with the second conventional example, the closed-sectional structure is formed at the divided portion of the dash panel using the upper and lower panels, and this calls for an increase in production costs since separate fabricating processes are involved, and additionally a complicated structure cannot be avoided.

SUMMARY OF THE INVENTION

Then, an object of the present invention is to provide a vehicle body front structure which can solve the problems inherent in the vehicle body front structures incorporating therein the conventional torque boxes, improve the rigidity at the rear end portion of the front frame and attain the sufficient transmission or dispersion of impact load to the side structures only with a simple structure.

To attain the object, according to a first aspect of the present invention, there is provided a vehicle body front structure including: a frame having a front frame and a floor frame joined together by a curved portion provided along a toe board, the front frame extending in a forward direction from the curved portion, the floor frame extending in a rearward direction therefrom; a side structure disposed transversely outwardly of the frame, respectively; and a closed-section torque box for joining the frame to the side structure, wherein the frame and the side structure are joined to an upper surface of the torque box to be substantially horizontally relative to each other, and the frame and the side structure are joined to a lower surface of the torque box which is formed in such a manner as to be oriented downwardly toward the side structure, to thereby increase the joint area of the torque box on a side thereof where the torque box is joined to the side structure.

Further, according to a second aspect of the present invention, there is provided a vehicle body front structure including: a frame having a front frame and a floor frame joined together by a curved portion providing along a toe board, the front frame extending in a forward direction from the curved portion, the floor frame extending in a rearward direction therefrom; a side structure disposed transversely outwardly of the frame, respectively; and a closed-section torque box for joining the frame to the side structure, wherein the torque box is joined to the frame in such a manner as to extend from the front frame to the curved portion.

According to a third aspect of the present invention, there is provided a vehicle body front structure according to the first or second aspect of the present invention, wherein the curved portion is joined to a lower surface at a rear end of the front frame.

According to a fourth aspect of the present invention, there is provided a vehicle body front structure according to any of the first to third aspects of the present invention, wherein the torque box is formed into a shape of a closed-section by a gusset disposed on an engine compartment side and the toe board joined to the gusset and disposed on a passenger compartment side, and wherein a first joint surface and a second joint surface are formed on an upper surface and a lower surface of the gusset, respectively, in such a manner as to be joined to corresponding surfaces of the toe board.

According to a fifth aspect of the present invention, there is provided a vehicle body front structure according to the fourth aspect of the present invention, wherein a third joint surface is formed from a front surface of the gusset toward the toe board.

According to a sixth aspect of the present invention, there is provided a vehicle body front structure according to any of the first to fifth aspects of the present invention, wherein the torque box is divided into a first torque box disposed transversely inside and a second torque box disposed contiguously with the first torque box and transversely outside.

According to a seventh aspect of the present invention, there is provided a vehicle body front structure according to the sixth aspect of the present invention, wherein the toe board is disposed on a passenger compartment side of the first torque box, between the first torque box and the second torque box and on an engine compartment side of the second torque box.

Thus, the rigidity of the portions in the vicinity of the rear end portions of the front frames is ensured by disposing the uniquely configured torque boxes between the front frames and the side structures, and the impact load can be transmitted or dispersed sufficiently to the side structures from the initial stage of deformation of the front frames, so that the front frames are allowed to deform in a stable fashion, whereby the damage to the passenger compartment can be minimized.

DETAILED DESCRIPTION OF THE PREFERRED EMBODIMENTS

Embodiments of a vehicle body front structure according to the present invention will be described below with reference to the appended figures.

Figure 1:
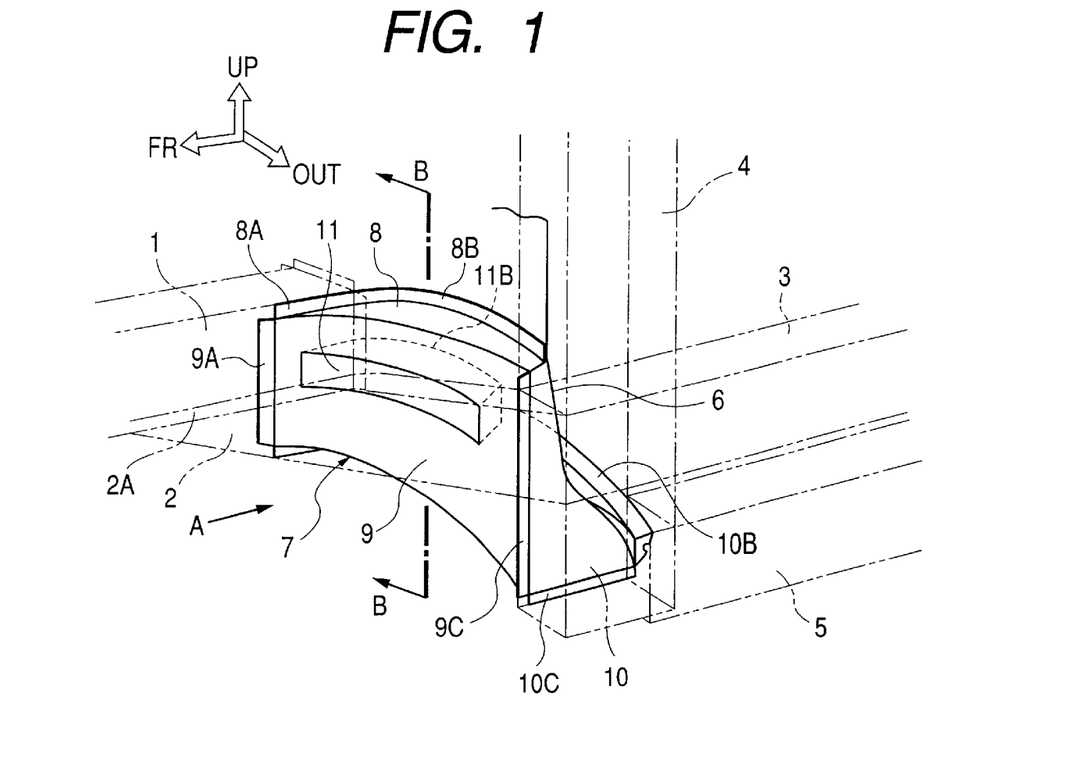
FIG. 1 is a perspective view of a main part of a first embodiment of a vehicle body front structure of the present invention.
Figure 2A:
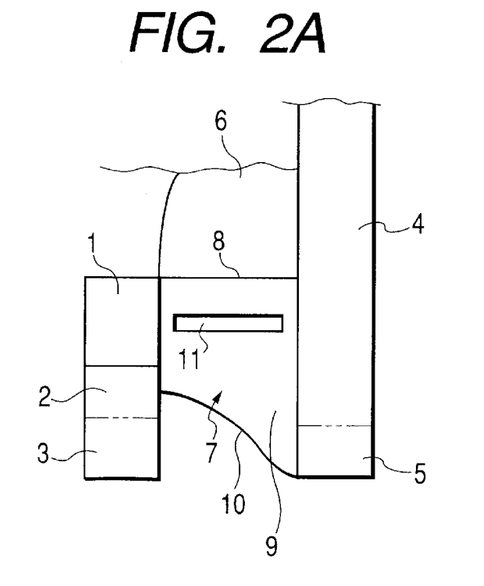
FIG. 2A is a front view of the first embodiment of the vehicle body front structure of the present invention as seen in a direction indicated by an arrow A in FIG. 1.
Figure 2B:
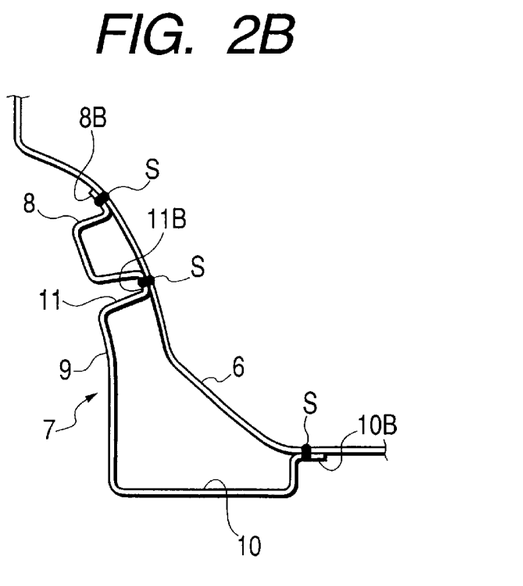
FIG. 2B is a cross-sectional view of the same taken along the line B—B in FIG. 1.

FIGS. 1 to 4 show a first embodiment of a vehicle body front structure according to the present invention. As shown in FIG. 1, a vehicle body front structure of the present invention includes front frames 1 (a right-hand side frame being not shown), floor frames 3 (a right-hand side frame being not shown), side structures 4, 5 and a crossed section torque box 7. The front frame 1 and the floor frame 3 extend forward and rearward, respectively, from a curved portion (frame) 2 provided along a toe board 6. The side structures 4, 5 are disposed transversely outwardly of the frames 1, 3, respectively. The closed-section torque box 7 joins the frames 1, 3 to the side structures 4, 5.

According to a first aspect of the present invention, in the above-mentioned vehicle body front structure, the frame 1 and the side structure 4 are joined to an upper surface 8 of the torque box 7 to be substantially horizontally relative to each other, and the frame 2 and the side structures 4, 5 are joined to a lower surface 10 of the torque box 7 which is formed in such a manner as to be oriented downwardly toward the side structures 4, 5, to thereby increase the joint area of the torque box 7 on a side thereof where the torque box 7 is joined to the side structures 4, 5.

Furthermore, according to a second aspect of the present invention, in the above-mentioned vehicle body front structure, the torque box 7 is joined to the frames in such a manner as to extend between the front frame 1 and the curved portion 2.

Figure 3:
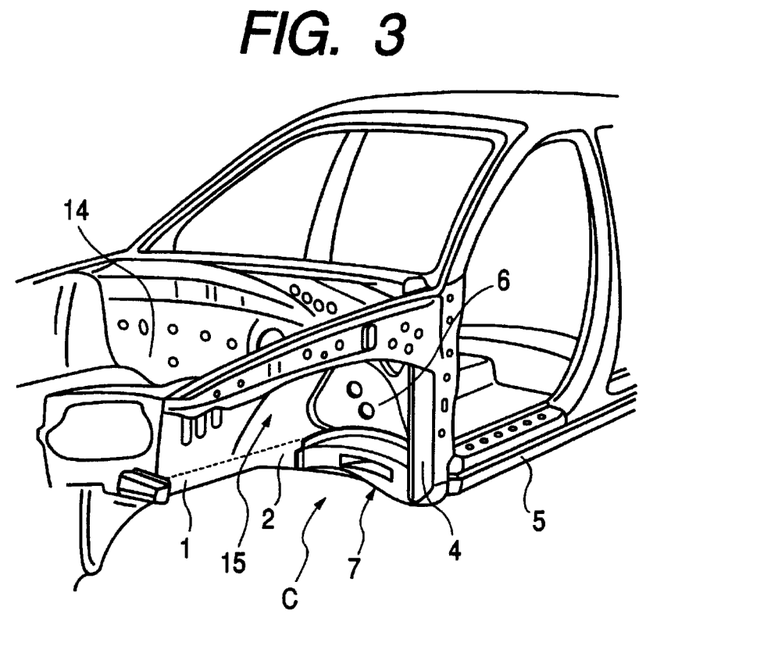
FIG. 3 is a perspective view of a front part of a vehicle body of the first embodiment of the vehicle body front structure of the present invention.
Figure 4:
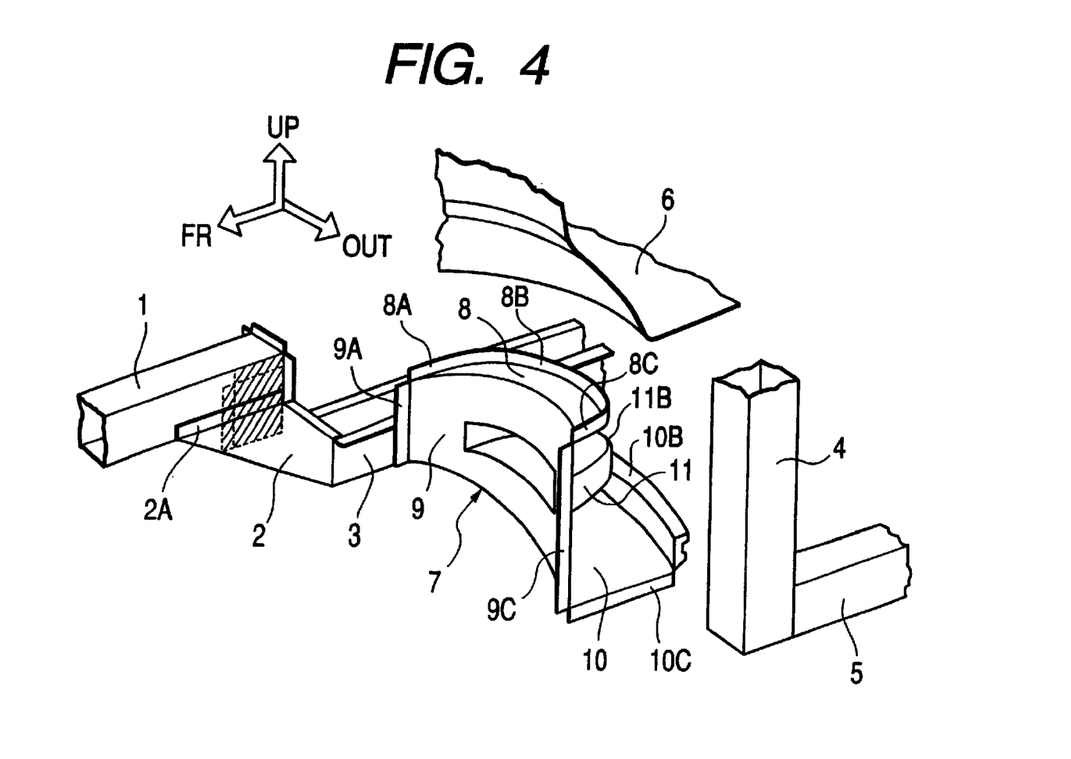
FIG. 4 is an exploded perspective view of a main part, which is indicated by reference character C in FIG. 3, of the first embodiment of the vehicle body front structure of the present invention.

To describe respective members constituting the vehicle body, as shown in FIG. 3, a pair of left and right front frames 1 (a right-hand side frame being omitted from description) extend longitudinally along the inner sides of wheel aprons of wheel wells 15 constituting side walls of an engine compartment 14 and inclines downwardly via the curved portion 2 from the toe board 6, as a boundary, which separates the engine compartment from a passenger compartment to connect to the floor frame 3 (refer to FIGS. 1 and 4). The curved portion 2 is preferably joined to a lower surface of a rear end of the front frame 1 with a joint flange 2A but it may be constructed as an integral part which continuously joins the front frame 1 to the floor frame 3. In addition, side structures which define the vehicle width are disposed outwardly of the frames by a distance equal to the width of the wheel well in which a wheel is accommodated. The side structures include a front pillar 4 and a side sill 5 joined to a lower end portion of the front pillar 4 so as to form a step portion. The toe board 6 constitutes a rear wall of the wheel well 15 which joins the frames 1, 2, 3 and the side structures 4, 5 in a transverse direction. To complement the rigidity reinforcement function of the toe board 6 the frames 1, 2, 3 and the side structures 4, 5 are joined together with the torque box 7 in the transverse direction.

As shown in FIG. 4, the toque box 7 according to the first embodiment of the present invention is constructed into a closed-sectional structure by joining a gusset portion having a substantially U-shaped cross section which is disposed on the engine compartment side to the toe board 6. The gusset portion includes the substantially horizontal upper surface 8, a front surface 9 which curves along the rear wall of the wheel well and the lower surface 10 which inclines downwardly toward the outward of the vehicle. Provided on the upper surface 8 in a curved fashion are an inner flange 8A joined to an outer surface of the front frame 1, a middle flange 8B constituting a first joint surface to the toe board 6 and an outer flange 8C joined to an inner surface of the front pillar 4. Provided on the front surface 9 in a curved fashion are an inner flange 9A stretching between the front frame 1 and the curved portion 2 to be joined thereto and an outer flange 9C joined to the inner surface of the front pillar 4. In addition, provided on the lower surface 10 in a curved fashion are an inner flange 10A (not shown) joined to an outer surface of the curved portion 2, a middle flange 10B constituting a second joint surface to the toe board 6 and an outer flange 10C stretching between the front pillar 4 and the side sill 5 to be joined thereto. Furthermore, a middle recessed portion 11 is formed from a substantially central portion of the front surface 9 toward the toe board 6, and a top portion is made to function as a middle flange 11B constituting a third joint surface to the toe board 6.

FIG. 1 shows a state in which the respective constituent components shown in the exploded perspective view of FIG. 4 are assembled together (shown in dashed lines except for the torque box 7). The construction relative to joints between the torque box 7 and the frames 1, 2, 3, as well as the side structures 4, 5 is clearly understood from FIG. 2A which is the front view of the portion shown in FIG. 1, and the construction relative to joints between the respective joint flanges of the torque box 7 and the toe board 6 is clearly understood from FIG. 2B which is the cross section of the portion shown in FIG. 1. Reference character S in FIG. 2B denotes a joint portion where the respective joint surfaces 8B, 10B and 11B of the torque box 7 and the toe board 6 are spot welded together. It is understood from these drawings that the inner side of the torque box 7 is joined to the front frame 1 and the curved portion 2 thereover, that the outer side thereof is joined to the front pillar 4 and the side sill 5 thereover via the lower surface 9 formed in such a manner as to be oriented downwardly which increases the joint area, and that the gusset portion having the substantially U-shaped cross section is jointed to the toe board 6 to form a strong closed-sectional structure (in particular, in the example illustrated in the figures, a two-box closed-sectional structure by a three-point joint between the torque box and the toe board 6 is realized by the formation of the middle recessed portion 11, whereby the stable joint is provided and the torque box is made stronger).

According to the structure as has been described heretofore, in case the vehicle is involved in a crash accident, whereupon an excessive impact load is applied to the vehicle from front, the impact load can be transmitted or dispersed from the front frame to the side structures via the torque boxes. Moreover, since the joint area of the torque box on the side where the torque box is joined to the side structures is constructed to be larger, the impact surface pressure on the side structure side can be reduced to increase the performance of resistance to impact. In addition, in a case where the joint of the torque box 7 to the frames is constructed to stretch between the front frame 1 and the curved section 2 (refer to a portion hatched with inclined lines in FIG. 4), the impact load can be transmitted or dispersed to the side structures via the torque box 7 from the initial stage of the deformation of the front frame 1, and the load can continue to be transmitted stably to the side structures 4, 5 side via the torque box 7 while the deformation propagates from the front frame 1 to the curved portion 2. As a result, the rigidity at the portion in the vicinity of the rear end portion of the front frame can be improved to provide a stable deformation behavior at the rear end portion of the front frame. Furthermore, even in a case where the curved portion 2, which is a separate member, is constructed to be joined to the lower surface of the rear end of the front frame 1 in view of the advantage of production, the joint between the curved portion 2 and the front frame 1 can be strongly reinforced with the joint flanges of the torque box 7.

Figure 5:
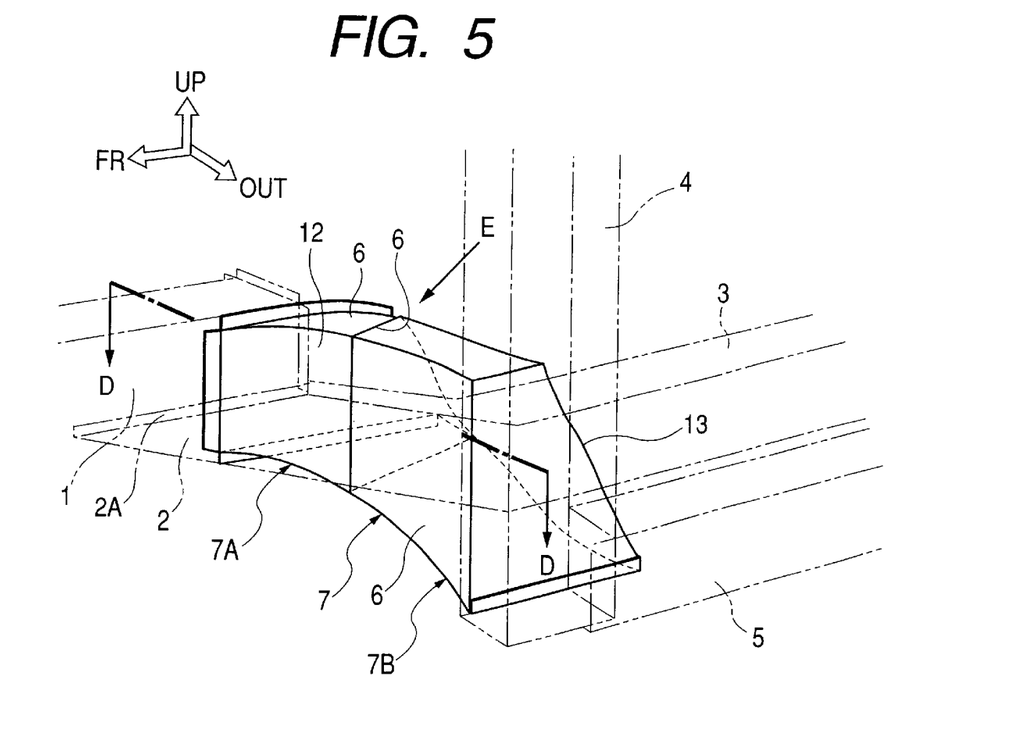
FIG. 5 is a perspective view of a main part of a second embodiment of a vehicle body front structure of the present invention.
Figure 6:
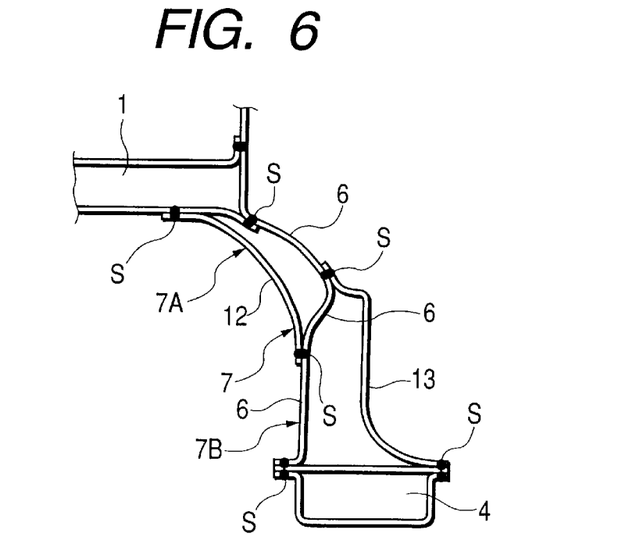
FIG. 6 is a cross-sectional view of the second embodiment of the vehicle body front structure of the present invention taken along the line D—D in FIG. 5.
Figure 7:
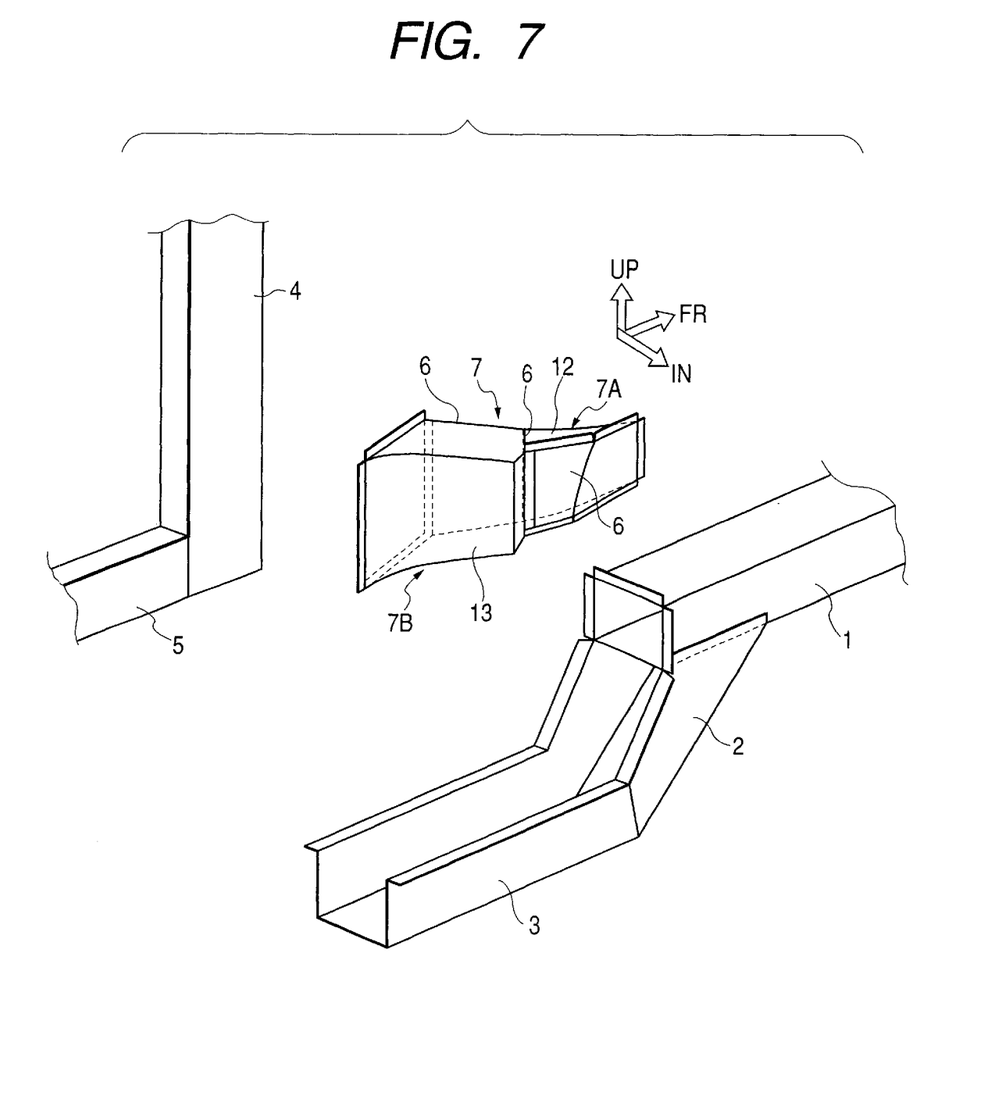
FIG. 7 is an exploded perspective view of the second embodiment of the vehicle body front structure as seen in a direction indicated by an arrow E in FIG. 6.

FIGS. 5 to 7 show a second embodiment of a vehicle body front structure according to the present invention. According to this embodiment, as shown in FIG. 5, a torque box 7 is divided into a first torque box 7A which is to be disposed in the inside of the vehicle body and a second torque box 7B disposed in the outside of the vehicle body in such a manner as to be contiguous with the first torque box 7A. As shown in FIG. 6, preferably the toe board 6 is disposed on a passenger compartment side of the first torque box 7A, between the first torque box 7A and the second torque box 7B and an engine compartment side of the second torque box 7B. Consequently, in the embodiment shown in the figures, a first gusset 12 constituted by joining the first torque box 7A to the toe board 6 is formed in a U-shaped cross section which opens to the passenger compartment side whereas a second gusset portion constituted by joining the second torque box 7B to the toe board 6 is formed in a U-shaped cross section which opens to the engine compartment side. Then, the toe boards 6, which are disposed on the open sides of the respective gussets, are jointed thereto.

According to the construction as described above, an inclined rising surface of the second gusset 13 which is provided in the outside of the vehicle body on the toque box 7 disposed on the passenger compartment side can be used as a foot rest for the driver or the front seat passenger, and in addition thereto, the toe board 6 disposed between the first and second gussets in a Z-shaped fashion functions as a stretching member having a closed-sectional structure, which can contribute to the improvement in rigidity, suppression of vibrations and improvement in resistance force against the impact applied from front. FIG. 7 is the exploded perspective view of the structure as viewed from the passenger compartment side, and it is clearly understood therefrom that the inclined rising surface of the second gusset 13 is situated on the viewer's side.

Thus, while the embodiments of the present invention have been described, selections may be made appropriately without departing from the spirit and scope of the present invention with respect to the construction relative to the configurations of the front frame, the curved portion and the floor frame including the respective cross sections thereof and the construction relative to the joint therebetween, the configurations of the front pillar and the side sill constituting the side structures and the construction relative to the joint therebetween, the configuration of the torque box (the closed-section is configured only by the torque box itself so that the toe board is attached thereto, as required) determined by the cross-sectional configuration of the gusset comprising the upper, lower and front surfaces including the configuration of the middle recessed portion and the mode of joint of the gusset to the toe board, the mode of joining the torque box and the frames and the side structures, the mode of dividing the torque box and the construction relative to the joint of the divided torque boxes to the toe board.

As has been described in detail heretofore, according to the present invention, the vehicle body front structure includes the front frames and the floor frames which extend forward and rearward, respectively, from the curved portions provided along the toe board, the side structures disposed transversely outwardly of the frames, respectively, and the closed-section torque boxes for joining the frames to the side structures, wherein the joint area of the torque box on the sides thereof where the torque box is joined to the side structures is increased by joining the frame to the side structure substantially horizontally on the upper surface of the torque box and joining the frame to the side structures on the lower surface of the torque box which is formed in such a manner as to be oriented downwardly. According to this structure, in case an excessive impact load is applied to the vehicle from front, the impact load can be transmitted or dispersed from the front frame to the side structures via the torque boxes, and moreover since the joint area of the torque box on the side where the torque box is joined to the side structures is constructed to be larger, the impact surface pressure on the side structure side can be reduced to increase the performance of resistance to impact.

In addition, according to the present invention, the vehicle body front structure includes the front frames and the floor frames which extend forward and rearward, respectively, from the curved portions along the toe board, the side structures disposed transversely outwardly of the frames, respectively, and the closed-section torque boxes for joining the frames to the side structures, and in this construction, in a case where the joint of the torque box to the frames is constructed to stretch between the front frame to the curved section, the impact load can be transmitted or dispersed to the side structures via the torque box from the initial stage of the deformation of the front frame, and the load can continue to be transmitted stably to the side structures side via the torque box while the deformation propagates from the front frame to the curved portion, whereby the rigidity at the portion in the vicinity of the rear end portion of the front frame can be improved to provide a stable deformation behavior at the rear end portion of the front frame. Furthermore, even in a case where the curved portion, which is a separate member, is constructed to be joined to the lower surface of the rear end of the front frame, the joint between the curved portion and the front frame can be strongly reinforced with the joint flanges of the torque box.

Furthermore, in a case where the curved portion is joined to the lower surface of the front frame at the rear end thereof, a curved frame can easily be produced by joining together relatively short members which can easily be adapted to the radius of curvature of the toe board.

Moreover, in a case where the torque box is formed into the shape of a closed-section by the gusset disposed on the engine compartment side and the toe board joined to the gusset and disposed on the passenger compartment side and where the first joint surface and the second joint surface are formed on the upper surface and the lower surface of the gusset, respectively, in such a manner as to be joined to the corresponding surfaces of the toe board, the strong closed-section structure can easily be obtained only by ensuring that the gusset having the U-shaped cross section on which the joint surfaces are formed is prepared to be combined with the toe board.

In addition, in a case where the third joint surface is formed from the front surface of the gusset toward the toe board, the two-box closed-section structure is realized through the three-point joint to the toe board, whereby the joint is made stable and the strong torque box is constructed.

Furthermore, in a case where the torque box is divided into the first torque box disposed transversely inside and the second torque box disposed contiguously with the first torque box and transversely outside, the divided torque boxes can be disposed at proper positions in accordance with their configurations, this improving the degree of freedom in design.

Moreover, in a case where the toe board is disposed on the passenger compartment side of the first torque box, between the first torque box and the second torque box and on then engine compartment side of the second torque box, the inclined rising surface of the second gusset which is disposed on the passenger compartment side can be used as the foot rest for the driver or the front seat passenger, and in addition thereto, the toe board disposed between the first and second gussets in the Z-shaped fashion functions as the stretching member having the closed-sectional structure, which can contribute to the improvement in rigidity, suppression of vibrations and improvement in resistance force against the impact applied from front.

Thus, according to the present invention, there is provided the vehicle body front structure provided with the torque boxes which can improve the rigidity of the portions in the vicinity of the rear end portions of the front frames only by the simple modifications to the structure and can sufficiently transmit or disperse the impact load to the side structures.

What is claimed is:

1. A vehicle body front structure comprising:
   a frame including a front frame and a floor frame joined together by a curved portion provided along a toe board, said front frame extending in a forward direction from the curved portion, said floor frame extending in a rearward direction therefrom;
   a side structure disposed transversely outwardly of said frame, respectively; and
   a closed-section torque box for joining said frame to said side structure,
   wherein said frame and said side structure are joined to an upper surface of said torque box to form joints and wherein the joint between said frame and said torque box, and the joint between said side structure and said torque box are substantially horizontally positioned relative to each other, and said frame and said side structure are joined to a lower surface of said torque box and wherein said lower surface extends downward toward said side structure, to thereby increase the joint area of said torque box on a side thereof where said torque box is joined to said side structure.

2. The vehicle body front structure according to claim 1, wherein said curved portion is joined to a lower surface of said front frame at a rear end of said front frame.

3. The vehicle body front structure according to claim 1, wherein said torque box comprises a gusset forming a closed section disposed on an engine compartment side and wherein said toe board is joined to said gusset and disposed on a passenger compartment side, and
   wherein a first joint surface and a second joint surface are formed on an upper surface and a lower surface of said gusset, respectively, in such a manner as to be joined to corresponding surfaces of said toe board.

4. The vehicle body front structure according to claim 3, wherein a third joint surface is formed from a front surface of said gusset toward said toe board.

5. The vehicle body front structure according to claim 1, wherein said torque box is divided into a first torque box disposed transversely inside and a second torque box disposed contiguously with said first torque box and transversely outside.

6. The vehicle body front structure according to claim 5, wherein said toe board is disposed on a passenger compartment side of said first torque box, between said first torque box and said second torque box and on an engine compartment side of said second torque box.

7. A vehicle body front structure comprising:
   a frame including a front frame and a floor frame joined together by a curved portion provided along a toe board, said front frame extending in a forward direction from the curved portion, said floor frame extending in a rearward direction therefrom;
   a side structure disposed transversely outwardly of said frame, respectively; and
   a closed-section torque box for joining said frame to said side structure,
   wherein said torque box is joined to said frame by a joint which extends from said front frame to said curved portion.

8. The vehicle body front structure according to claim 7, wherein said curved portion is joined to a lower surface of said front frame at a rear end of said front frame.

9. The vehicle body front structure according to claim 7, wherein said torque box comprises a gusset forming a closed section disposed on an engine compartment side and said toe board joined to said gusset and disposed on a passenger compartment side, and
   wherein a first joint surface and a second joint surface are formed on an upper surface and a lower surface of said gusset, respectively, in such a manner as to be joined to corresponding surfaces of said toe board.

10. The vehicle body front structure according to claim 9, wherein a third joint surface is formed from a front surface of said gusset toward said toe board.

11. The vehicle body front structure according to claim 7, wherein said torque box is divided into a first torque box disposed transversely inside and a second torque box disposed contiguously with said first torque box and transversely outside.

12. The vehicle body front structure according to claim 11, wherein said toe board is disposed on a passenger compartment side of said first torque box, between said first torque box and said second torque box and on an engine compartment side of said second torque box.

13. The structure of claim 1, wherein said torque box comprises a first torque box and a second torque box.

14. The structure of claim 13, wherein said first torque box is disposed transversely inside of said second torque box.

15. The structure of claim 13, wherein said second torque box is disposed contiguously with said first torque box.

16. The structure of claim 13, wherein said second torque box is disposed transversely outside of said first torque box.

17. The structure of claim 13, wherein said toe board is disposed on a passenger compartment side of said first torque box.

18. The structure of claim 17, wherein said toe board is disposed between said first torque box and said second torque box.

19. The structure of claim 17, wherein said toe board is disposed on an engine compartment side of said second torque box.

20. The structure of claim 7, wherein said torque box comprises a first torque box and a second torque box.

21. The structure of claim 20, wherein said first torque box is disposed transversely inside of said second torque box.

22. The structure of claim 20, wherein said second torque box is disposed contiguously with said first torque box.

23. The structure of claim 20, wherein said second torque box is disposed transversely outside of said first torque box.

24. The structure of claim 20, wherein said toe board is disposed on a passenger compartment side of said first torque box.

25. The structure of claim 24, wherein said toe board is disposed between said first torque box and said second torque box.

26. The structure of claim 24, wherein said toe board is disposed on an engine compartment side of said second torque box.

* * * * *